INVENTORS
DAVID PALCHIK
WILLIAM H. CLAYTON JR.
BY E L Kochey
AGENT

United States Patent Office 3,291,106
Patented Dec. 13, 1966

3,291,106
VAPOR GENERATOR WITH GAS
RECIRCULATION
David Palchik, Bloomfield, and William H. Clayton, Jr.,
Windsor, Conn., assignors to Combustion Engineering, Inc., Windsor, Conn., a corporation of Delaware
Filed Sept. 7, 1965, Ser. No. 485,321
9 Claims. (Cl. 122—479)

This invention is related to once-through steam generators with gas recirculation and in particular to a method and apparatus for regulating the location of the introduction of the recirculated gas into the furnace to achieve uniform temperature of the fluid leaving the furnace walls around the periphery thereof.

Gas recirculation is commonly used to regulate the final steam temperature of a steam generator. Gas is withdrawn from the flue of the steam generator at a location downstream of convection heating surface and reintroduced into the furnace. It is well known that such gas recirculation has the effect of cooling the furnace and decreasing the heat absorption in this zone, while increasing the heat transfer to the convective surfaces due to the additional gas weight flowing thereover and due to the higher gas temperatures exiting in areas remote from the furnace.

Generally, such gas recirculation is regulated to control the temperature of the steam leaving a particular convection section of the steam generator. However, such gas recirculation actually controls the distribution of heat exchange between the furnace and the convection surfaces. Accordingly, gas recirculation has been suggested as a means of controlling the general temperature level of the fluid leaving the furnace circuit, while other means are used to control the final steam temperature.

This phenomena occurs in part due to the lower gas temperature within the furnace generally. The recirculated gas has been in the past introduced into particular locations in the furnace where it was suspected that particularly high heat absorption rates did occur, as illustrated in U.S. Patent 2,851,015 issued to P. H. Koch. The general object of such selective introduction of recirculated gases is to decrease the heat absorption rate in the particular area absorbing excessive heat, and thereby reducing the local furnace material temperatures. At least three factors affect such reduction. The lower gas temperature adjacent the heating surface reduces the radiant heat absorption nominally. It has a more substantial effect on the convection heat absorption of the furnace wall tubes, which occurs even in radiant furnaces. Furthermore, the gas which is recirculated from the rear gas pass of the unit contains a high percentage of inert gases. When introduced so that it may be intermixed with the burning fuel, it is operative to delay combustion.

High heat absorption rates often occur in the burner zone with consequent high metal temperatures. Areas that have been of particular concern are the walls of a unit directly opposite the burners of a front fired unit where there is a likelihood of substantial flame impingement or the relatively flat floor tubes on some units. These floor tubes are susceptible to overheating due to the fact that the steam-water mixture flowing within the tubes may tend to separate so that they are steam cooled on the upper surface which is exposed to the flames. Refractory materials in the furnace are also endangered by localized high temperatures. Such gas recirculation has, accordingly, been introduced in an attempt to lower the local heat absorption rates in these particularly sensitive areas.

Once-through steam generators may operate at either subcritical or supercritical pressure. When operating at subcritical pressure the fluid leaving the waterwalls is usually at such a level that it contains some superheat. In a supercritical steam generator there is, of course, no saturation temperature. In either of these cases, an unbalance in heat absorption between various tubes results in differential temperatures at the outlet of the furnace wall. The unbalanced temperatures are also aggravated to the high specific volume that occurs along with high temperature. This high specific volume operates to restrict the flow through the tube therefore resulting in even higher temperatures. These differential temperatures can cause substantial stresses and strains in the furnace wall structure.

The furnace wall tubing is often divided into groups of parallel tubes, each one being independently supplied. These groups may then be orificed based on anticipated heat absorptions of these circuits with the outlet temperature during actual operation being whatever it happens to be. Alternately, in some units the temperature of the outlet is measured and the flow to the various parallel groups is controlled to maintain uniform outlet temperatures. With such an operation although the temperature at the outlet is generally balanced, a section receiving little heat absorption throughout its length will have its flow substantially reduced thereby avoiding the temperature difference problem at the outlet. If this group of tubes operating with a reduced flow has a particular section of it which has a high local heat absorption rate, the low flow causes poor film conductances inside the tube and results in extremely high local metal temperatures.

In our invention the total quantity of recirculated gas is controlled to regulate the relative heat absorption between the furnace wall circuits and the convection circuits such as is accomplished when it is based on reheat steam temperature control. The distribution of gases within the furnace is controlled, not in relation to particular hot spots, but to achieve uniform temperatures leaving parallel through-flow circuits which form the furnace walls considering the integrated heat absorption throughout the length of the circuit.

It is an object of our invention to minimize the heat absorption difference between parallel through-flow sections of the furnace wall through-flow circuit of a steam generator.

It is a further object to minimize the temperature difference between parallel through-flow sections of the furnace wall of a through-flow steam generator.

Other and further objects of the invention will become apparent to those skilled in the art as the description proceeds.

With these objects in view, the invention comprises an arrangement, construction and combination of the elements of the inventive organization in such a manner as to attain the results desired. These are more particularly set forth in the following detailed description of an illustrative embodiment. This embodiment is shown by the accompanying drawing wherein.

Figure 1:
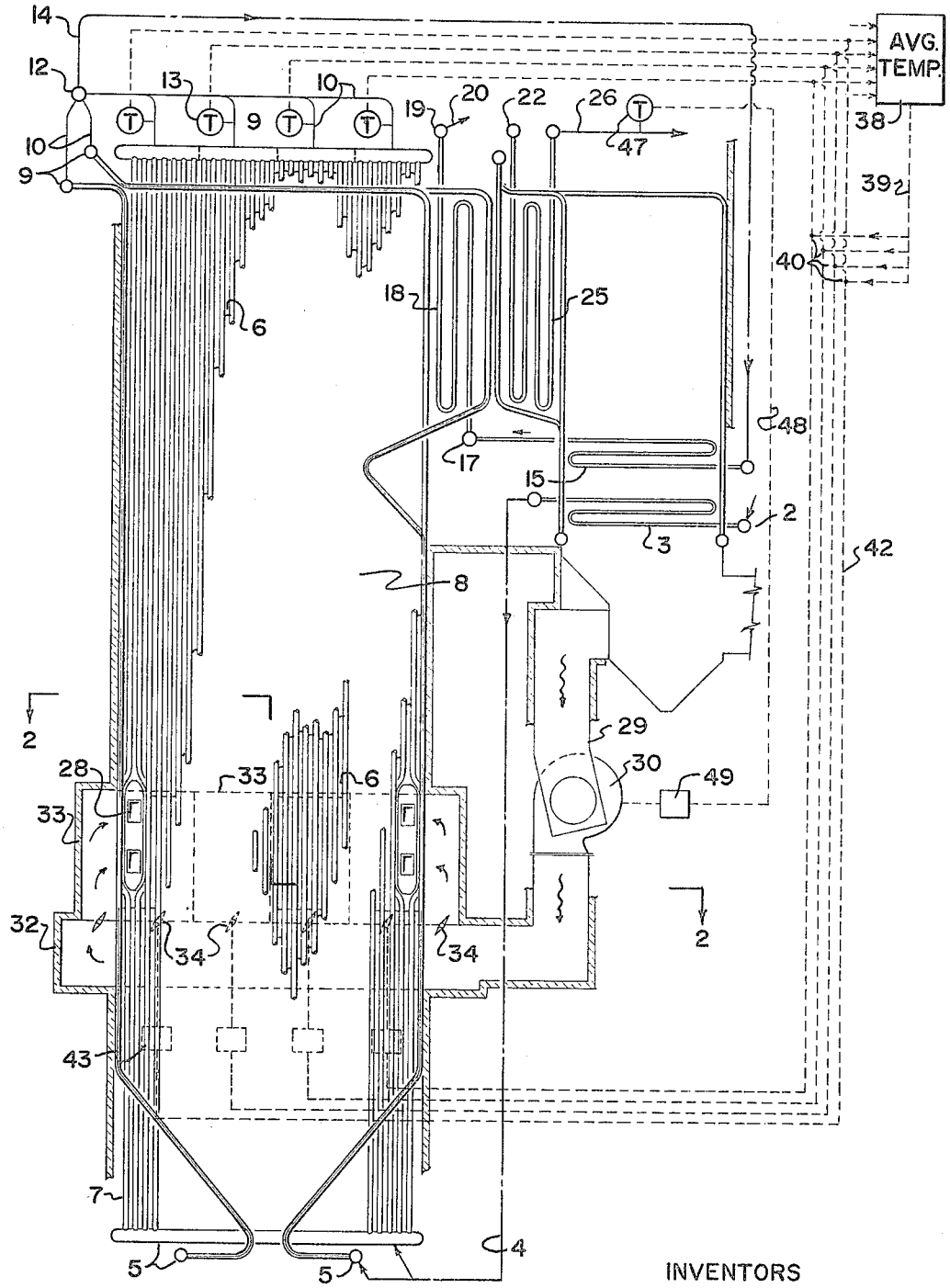
FIGURE 1 is a sectional side elevation of a steam generator.
Figure 2:
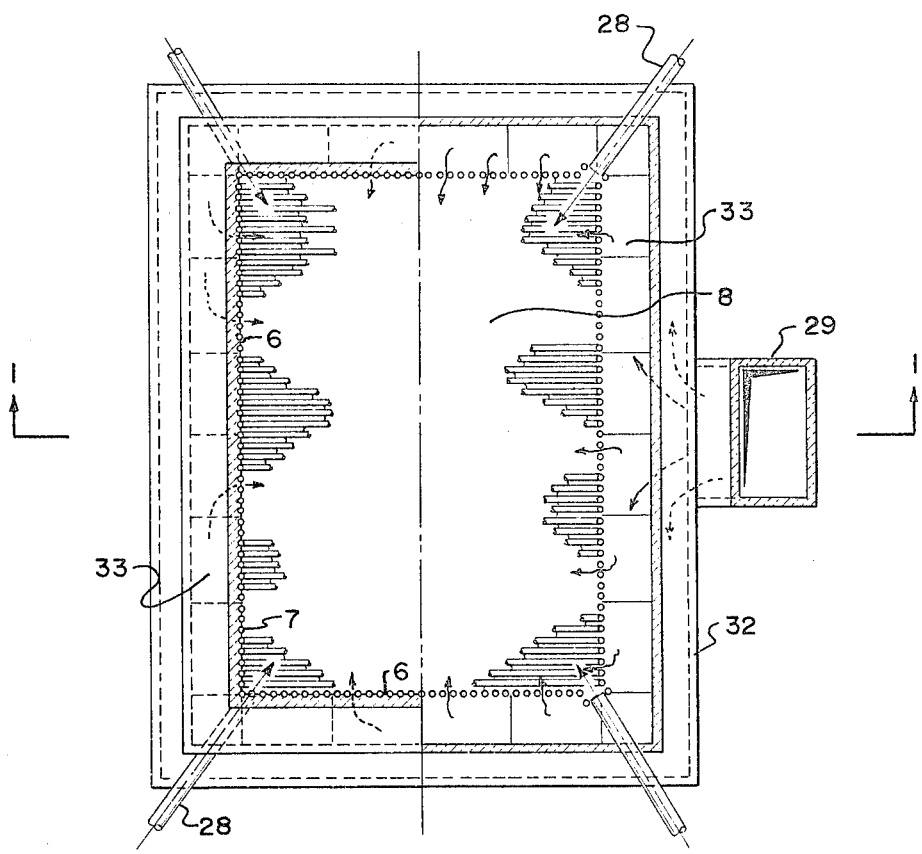
FIGURE 2 is a section plan view illustrating the peripheral location of the gas recirculation distributing arrangement.

In the system of the illustrated specific embodiment feedwater enters the steam generator through economizer inlet header 2 passing through economizer 3 to the furnace wall supply pipe 4. This pipe conveys the incoming feedwater which has been heated in the economizer to the furnace wall inlet headers 5. Furnace wall tubes 7 line the walls of the furnace 8 passing upward in parallel relation to the furnace wall outlet headers 9. These walls are of the web wall construction having fins 6 welded between adjacent tubes. The fluid is heated in passing through these furnace wall tubes and the outlet header 9 is divided into a plurality of independent sections each containing its own relief tube 10. The heated fluid is conveyed through these relief lines to the furnace outlet collecting header 12. Since the fluid leaving each of the furnace wall sections has been segregated, the temperature of the fluid leaving each section may be determined by temperature transmitters 13.

Low temperature superheat supply pipe 14 then conveys this fluid through the low temperature superheater 15 to the intermediate superheater header 17 from which it continues through the high temperature superheater 18 to the superheater outlet header 19. The steam is then conveyed through main steam line 20 to the high pressure section of a steam turbine (not shown).

Steam from the high pressure section of the steam turbine is returned to the steam generator for reheating. It enters through reheat inlet header 22 passing through the reheater 25 and passing to the low pressure turbine (not shown) through the reheat steam line 26.

Fuel is fired tangentially in the steam generator through burners 28 located in the four corners of the furnace. Combustion occurs in the furnace 8 with gaseous combustion products passing out through the flue of the boiler. These gases pass over the high temperature superheater 18, the reheater 25, the low temperature superheater 15 and economizer 3 before being conveyed to the atmosphere through an air heater (not shown).

Gases are withdrawn from the flue at a location downstream of the economizer 3 through gas recirculation duct 29. Gas recirculation fan 30 supplies the motive power to return the recirculated gases to the furnace through the gas recirculation distribution duct 32. These gases do not enter the furnace directly from this duct but pass to the individual gas recirculation plenums 33. These plenums surround the periphery of the furnace with the furnace wall tubing being formed at these locations so that the recirculated gases may pass intermediate the adjacent tubes. This is accomplished by omitting the fins between adjacent tubes in the plenum area. Proportioning flow dampers 34 regulate the relative amounts of recirculated gas passing to each of the plenums and, accordingly, the amount of gas being introduced to the furnace through the respective plenums.

Each of these plenums is associated with a group of furnace wall tubes which exits in a particular section of the furnace wall outlet headers 9. An increase in the recirculated gas passing through a particular plenum cools the outer surfaces of the tubes over which it passes. It also decreases the radiant heat adsorption in that particular section to some extent and decreases the convection heat absorption substantially. The gas being introduced generally in the zone of combustion mixes with the outer edge of the flame envelope. Since this recirculated gas consists mostly of inert gases, it momentarily starves the flame at this location and delays combustion in this general area where the gas is introduced. Each of these functions of the increased recirculated gas entrance operates to decrease the heat absorption in that particular zone.

It is desired to control this distribution of gas recirculation in such a manner as to maintain uniform temperatures of the fluid leaving the furnace wall tubes through headers 9. Due to the random slag patterns which occur in the walls the sections of the furnace wall tubes which are absorbing the most heat in the burner zone are not necessarily those which absorb the most heat throughout the entire furnace. For instance, slag often tends to accumulate more heavily in the corner sections of the furnace. This slag tends to insulate these sections and may result in a low heat absorption throughout a substantial height of the furnace. This may occur at the same time that this particular corner section is receiving a very high heat absorption rate in the burner zone. When such a situation occurs, it is not desired to reduce the extremely high rate occurring in the burner zone but to permit this rate to exist, compensating for the heavy slag layer that occurs elsewhere.

Similar distortion may occur of the heat absorption patterns of slag free units due to erratic combustion patterns within the furnace.

Orificing of the furnace wall circuits is done before initial operation of the unit on the basis of calculated heat absorptions. This unit may then be operated throughout its load range using gas recirculation for the control of the reheat steam temperature. The dampers 34 may be manually regulated to achieve maximum temperature equalization between the various relief tubes 10. Through operating experience it may be found that a particular setting of these dampers can be established by manually adjusting these dampers in response to the temperature and thereafter fixing them at the particular positions so determined.

Alternately, a more comprehensive control system may be employed as illustrated. From each of the temperature transmitters 13 a control signal is emitted through control line 37. A control signal from each of the temperature transmitters is passed to controller 38 which averages the various tempearture signals entering and sends out a signal representative of the average temperature through control line 39. The average temperature signal is then compared to the actual temperature signals from each of the temperature transmitters at summation points 40 with an error signal continuing through control lines 42 to the proportioning damper controllers 43. These controllers operate the gas recirculation proportioning flow dampers 34 opening these dampers when the temperature of the corresponding furnace wall section is high or closing the dampers when the temperature tends to be low. It should be emphasized that these proportioning dampers 34 do not regulate the total quantity of gas being recirculated but only the distribution of the gas which is recirculated.

The total quantity of recirculated gas is regulated in response to the temperature of the reheat steam passing through the reheat steam pipe 26. This temperature is sensed by temperature transmitter 47 with a control signal representing that temperature being passed through control line 48. This signal enters gas recirculation fan controller 49 which controls the speed of the gas recirculation fan 30 to hold the reheat steam temperature at a desired value.

While we have illustrated and described a preferred embodiment of our invention it is to be understood that such is merely illustrative and not restrictive and that variations and modifications may be made therein without departing from the spirit and scope of the invention. For instance, the heat absorption of the various furnace wall sections may be determined by methods other than simply measuring the furnace wall outlet temperature. The flow in each furnace wall section may be regulated in accordance with a pre-selected outlet temperature or steam dryness condition and the heat absorption of the various sections determined by measuring the flow through the particular section. We therefore do not wish to be limited to the precise details set forth but desire to avail ourselves of such changes as fall within the purview of our invention.

What we claim is:

1. A once-through vapor generator having a furnace, burners for burning fuel within said furnace; a flue for conveying combustion gases away from said furnace, and steam heating surface located in said flue, comprising: furnace wall tubing lining the walls of said furnace, said furnace wall tubing being divided into a plurality of parallel sections; means for passing fluid flow through the furnace wall tubes; means for determining the relative heat absorption of each of the parallel sections; means for recirculating gas from the flue downstream of said steam heating surface with respect to gas flow into the furnace at a plurality of locations; each of said locations being associated with a corresponding furnace wall section so that introduction of gases at said location decreases the heat absorption of the corresponding wall section; means responsive to the relative heat absorption of each section to regulate the relative quantity of gases introduced at each location; and means to regulate the quantity of gas recirculation in accordance with the distribution of heat absorption between the furnace wall tubing and the steam heating surface.

2. An apparatus as in claim 1 where the means to regulate the quantity of gas recirculation in accordance with the distribution of heat between the furnace wall tubes and steam heating surface comprises means for regulating the quantity of gas recirculation in response to the temperature of the steam leaving said steam heating surface.

3. An apparatus as in claim 1 wherein the means to determine the relative heat absorption of each section comprises: means for determining the temperature leaving each section; means for determining the average temperature leaving all sections; and means for comparing the temperature leaving each section with the average temperature leaving all sections.

4. An apparatus as in claim 3 wherein said burners are located in the corners of the furnace so as to project the fuel into the furnace tangentially; said plurality of locations for introducing recirculated gas to the furnace comprising a plurality of entrances around the periphery of the furnace at or below the burner elevation.

5. An apparatus as in claim 4 wherein the furnace wall tubes are formed with welded fins intermediate the adjacent tubes and welded thereto; the fins being removed in the area of recirculated gas introduction so that the gas may be introduced through the wall at these locations where the fins are removed.

6. In a once-through vapor generator the method of operating comprising: burning fuel in a combustion zone and forming combustion products; passing a first flow of fluid in generally radiant heat exchange with the combustion zone in a plurality of parallel paths; passing a second flow of fluid in generally convection heat exchange with said combustion products; recirculating a portion of the combustion products which have been passed in heat exchange relation with said second flow of fluid to said combustion zone; regulating the quantity of gases recirculated to control the relative heat absorption of the first and second fluids; sensing the temperature of the fluid in each of said parallel paths; determining the average temperature of the fluid leaving all of said parallel paths; and adjusting the temperature leaving each of the parallel paths to approach the average temperature leaving all of the parallel paths by regulating the location of introduction of recirculated gases to the combustion zone.

7. In a once-through vapor generator the method of operating comprising: burning fuel in a combustion zone and forming combustion products; passing a first flow of fluid in generally radiant heat exchange with the combustion zone in a plurality of parallel paths; passing a second flow of fluid in generally convection heat exchange with said combustion products; recirculating a portion of the combustion products which have been passed in heat exchange relation with said second flow of fluid to said combustion zone; regulating the quantity of gases recirculated to control the heat absorption in the second fluid heat exchange; sensing the temperature of the fluid in each of said parallel paths; determining the average temperature of the fluid leaving all of said parallel paths; and adjusting the temperature leaving each of the parallel paths to approach the average temperature leaving all of the parallel paths by regulating the location of introduction of recirculated gases to the combustion zone.

8. In a through-flow vapor generator having a furnace, a flue for conveying gaseous products from said furnace; tubes lining the furnace walls including a plurality of parallel flow paths, a plurality of locations for introduction of recirculated gases to the furnace corresponding one to one with the flow paths, and vapor heating surface in said flue, a method of operation comprising: passing a fluid through the tubes lining the furnace walls; burning fuel in the furnace, forming combustion products, and absorbing heat in the fluid flowing through the tubes lining the furnace walls; passing vapor through the steam heating surface; conveying the combustion products through the flue and over the vapor heating surface, thereby transferring the heat to the vapor; recirculating combustion products from a location downstream of the vapor heating surface to the furnace; determining the relative heat absorption of the fluid flowing through the furnace walls and that flowing through the vapor heating surface; regulating the quantity of recirculated gases in accordance with such determination; determining the relative heat absorption in each of the parallel flow paths of the furnace wall tubing; and regulating the location of introduction of recirculated gases through said plurality of locations to minimize the differential heat absorption in the parallel paths.

9. In a through-flow vapor generator having a furnace, a flue for conveying gaseous products from said furnace, tubes lining the furnace walls including a plurality of parallel flow paths, a plurality of locations for introduction of recirculated gases to the furnace corresponding one to one with the flow paths, and vapor heating surface in said flue, a method of operation comprising: passing a fluid through the tubes lining the furnace walls; burning fuel in the furnace, forming combustion products, and absorbing heat in the fluid flowing through the tubes lining the furnace walls; passing vapor through the steam heating surface; conveying the combustion products through the flue and over the vapor heating surface, thereby transferring heat to the vapor; recirculating combustion products from a location downstream of the vapor heating surface to the furnace; determining the relative heat absorption of the fluid flowing through the furnace walls and that flowing through the vapor heating surface; regulating the quantity of recirculated gases in accordance with such determination; determining the temperature of the fluid leaving each of the parallel flow paths of the furnace wall tubing; and regulating the location of introduction of recirculated gases through said plurality of locations to minimize the temperature difference between the fluid leaving each of the parallel paths.

References Cited by the Examiner

UNITED STATES PATENTS 2,840,054   1/1958   Rowand et al. _____ 122—479

KENNETH W. SPRAGUE, *Primary Examiner.*